United States Patent [19] [11] 4,007,472
Land [45] Feb. 8, 1977

[54] FLAT BATTERY WITH DRY CATHODE STRATA AND SLURRY CATHODE STRATA
[75] Inventor: Edwin H. Land, Cambridge, Mass.
[73] Assignee: Polaroid Corporation, Cambridge, Mass.
[22] Filed: Jan. 8, 1976
[21] Appl. No.: 647,590

Related U.S. Application Data
[63] Continuation-in-part of Ser. No. 495,628, Aug. 8, 1974, abandoned.
[52] U.S. Cl. .............................. 429/153; 429/158; 429/162
[51] Int. Cl.² .......................................... H01M 6/46
[58] Field of Search ................. 136/111, 83 R, 107; 429/152–155, 162, 158

[56] References Cited
UNITED STATES PATENTS

| | | |
|---|---|---|
| 2,870,235 | 1/1959 | Soltis .................. 136/111 |
| 3,069,485 | 12/1962 | Winger et al. ................. 136/107 X |
| 3,615,858 | 10/1971 | Soto-Krebs ..................... 136/111 X |
| 3,694,266 | 9/1972 | Bergum et al. .................... 136/111 |
| 3,697,328 | 10/1972 | Bilhoin .......................... 136/111 X |
| 3,706,616 | 12/1972 | Bergum et al. ................. 136/111 X |
| 3,827,916 | 8/1974 | Fagan, Jr. ...................... 136/111 X |

Primary Examiner—C. F. LeFevour
Attorney, Agent, or Firm—Stanley H. Mervis

[57] ABSTRACT

A planar primary battery particularly suited for photographic applications characterized in exhibiting high current drain capacity. The battery structure includes positive active components including two cathode strata, one cathode stratum being a slurry of a particulate cathode active material in aqueous electrolyte, the other cathode stratum comprising a particulate dispersion of dry cathode active particles in a binder matrix bonded to the surface of a polymeric current collector.

18 Claims, 5 Drawing Figures

| PHOTOGRAPHIC CYCLE NO. | FLASH UNIT CHARGE INTERVALS – SECONDS | | |
|---|---|---|---|
| | DRY PATCH STRUCTURE – ANODE AND CATHODE | DRY PATCH ANODE & ELECTROLYTE DRY PATCH CATHODE & SLURRY CATHODE MIX | DRY PATCH & SLURRY – BOTH ELECTRODES |
| 1 | 6.2 | 4.4 | 4.2 |
| 2 | 7.6 | 5.0 | 4.6 |
| 3 | 9.4 | 5.2 | 4.8 |
| 4 | 11.6 | 5.6 | 5.2 |
| 5 | 14.0 | 6.2 | 5.4 |
| 6 | 16.8 | 6.4 | 5.8 |
| 7 | 21.2 | 7.0 | 6.0 |
| 8 | 29.4 | 7.4 | 6.4 |
| 9 | 53.6 | 8.0 | 6.8 |
| 10 | BATTERY FAILURE | 8.4 | 7.0 |

FLAT BATTERY WITH DRY CATHODE STRATA AND SLURRY CATHODE STRATA

This application is in part a continuation of my co-pending application Ser. No. 495,628 filed Aug. 8, 1974, now abandoned.

BACKGROUND

This invention relates to electrical energy power supplies and more precisely, to specialized batteries which have special utility in packs or assemblies comprising a container holding self-developing film unit(s) integrated with an electrical power supply system.

U.S. Pat. Nos. 3,705,542; 3,543,662; 3,543,663, and 3,595,661 relate to photographic film packs comprising an enclosure containing self-developing film units integrated with a power supply system. Such film packs are presently employed exclusively in a photographic camera sold by Polaroid Corporation of Cambridge, Mass., U.S.A. under the trade name "SX-70".

Essentially, film packs or cassette structures described in those patents comprise an opaque enclosure containing a dark slide for covering an exposure station in a forward wall of the container, a stack of individual "self-developing" film units positioned behind the dark slide, means for urging the stack of film units towards the forward wall to position the uppermost film unit in the stack in the exposure station and an electrical power supply system for operating electrical mechanisms of a camera designed for using the pack.

As disclosed in U.S. Pat. Nos. 3,750,551 and 3,760,701, when the film pack is inserted into the camera, the dark slide automatically is removed through a withdrawal slot at one end of the enclosure to uncover the exposure station and the uppermost film unit is urged into position in the exposure station by the means mentioned before which usually involves a spring biased platen.

A photographic cycle for the camera involves a somewhat complex series of operational events each imposing electrical power demands and each being controlled by an integrated solid state control circuit. As detailed in U.S. Pat. No. 3,774,516, this control circuit monitors several mechanical manipulations of the instrumentalities of the device involving a dual energization of a d.c. dynamoelectric motor as disclosed in U.S. Pat. Nos. 3,811,081 and 3,731,608 as well as a select multiple energization of exposure regulating tractive electromagnetic drives as described inter alia, in U.S. Pat. Nos. 3,791,278; 3,750,543; 3,805,204 and 3,820,128. The operational events carried out by the camera include those of securing an exposure chamber, reflex optical path conversion, exposure regulation of a film unit, motor driven film unit removal and processing as well as the noted automatic dark slide removal.

To power the camera throughout a series of the above-catalogued operational events, a battery power supply is required which exhibits a low internal impedance and is capable of providing a relatively high current output with multi-cycle capacity. During its powering activity, the battery is called upon to maintain the predetermined voltage levels required for operating integrated logic control circuits.

The "self-developing film" for such packs or cassettes is sometimes described as an integral negative-positive film unit having as essential elements, a photosensitive element having a photosensitive system for providing a diffusion transfer image, an image-receiving element, an opacification system and a rupturable container holding a processing composition. The elements are integrated such that upon distribution of processing composition within an exposed unit, a diffusion transfer image is provided in the image-receiving element which image is viewable against a reflective background without peeling the film unit apart. The film units are adapted for processing outside the camera since effective protection against further exposure is provided by way of the opacification system which in some integral negative-positive film units is integrated with the unit prior to exposure of the photosensitive system while in others, the opacification system is integrated with the unit after exposure. In the preferred integral negative-positive film units, the opacification system comprises a combination of light-absorbing dyes and a light-reflecting material or pigment and this combination is included in the rupturable container and distributed between the photosensitive and image-receiving elements after exposure. Further details relative to the integral negative-positive film units may be found in U.S. Pat. Nos. 3,415,644; 3,415,645; 3,415,646 and 3,647,437 among others.

A particularly desirable attribute of the noted camera-film system resides in the foldability of the camera component thereof into a thin, compact configuration suited for facile portage. The availability of such design compactness stems, in part, from the utilization of a flat battery structure in combination with the film cassette for the power supply of the camera. Of considerable importance to the system, however, by providing a battery which is discardable with an exhausted film cassette, the camera operator is assured of the presence of a fresh power supply upon each replenishment of a film supply to the camera. Essentially, the film pack contained power source has comprised a battery of the type described in detail in U.S. Pat. Nos. 3,543,662; 3,563,805; 3,617,387 and 3,734,780 among others. Such flat or planar batteries are primary batteries of the Le Clanche type including a zinc anode system, a manganese dioxide cathode system and an aqueous electrolyte of ammonium chloride, zinc chloride and usually a small amount of mercuric chloride. When the film pack is inserted into the camera, the battery integrated therewith is connected to the camera's electrical system to provide a power source of sufficient current capacity and evidencing requisite low internal impedance for operating the camera through a given number of cycles, for instance, ten. When all film units in the pack are exposed and transported from the camera, the pack — containing the battery — is discarded.

As alluded to above, the desired performance characteristics of batteries of the type described above are well defined. Essentially, such batteries must be compact and specifically configured for effective integration and assembly with the film pack and at the same time provide the requisite electrical energy for efficient operation of the camera and related accessories until depletion of the supply of film units in the film pack. In addition to the exhibition of adequate capacity characteristics, the flat battery power supply is called upon to have a shelf life or storage capability commensurate with that of the photographic film with which it is intimately packaged. Inasmuch as the batteries are designed to be discarded together with the empty film pack, an economic constraint is involved requiring that they be produced by way of high volume, low cost processes which inevitably dictates the involvment of a high speed, online continuous process capable of efficiently assembling batteries and providing maximum production of acceptable batteries with minimum rejects.

As described in copending application U.S. Pat. Ser. No. 411,254 filed Oct. 31, 1973 entitled "Electronic Photographic System" by E. H. Land and assigned in common herewith, it is highly desirable that the thin flat batteries, while still remaining fabricable at a unit cost permitting them to be discarded, following the expenditure of about 10 film units, be capable of providing the power required to charge the capacitor of an electronic flash unit. This current drain capability should be such as to permit recharging over an extended number of photographic cycles, for instance, the 10 cycles required to expend the film of a package, and provide such charging at a relatively rapid rate. The charging capability for the discardable batteries should be suitable for photographic system energy requirements of, for example, about 100 watt seconds for each photographic cycle, i.e., camera actuation.

From the foregoing, it may be observed that the capability of each discrete battery should be such as to accommodate diverse criteria. For instance, it should provide requisite capacity to meet the complex operational demands of the camera; it should exhibit a storage or shelf life commensurate with that of the film with which it is to be packaged; and it should be adaptable for manufacture using high volume manufacturing techniques at unit costs permitting the highly desirable discardable feature of the film supply-battery supply component of the photographic system. Finally, while remaining thin and compact, it is desirable that the batteries be capable of supplying the energy required of auxiliary devices, for instance, to charge the capacitor of an electronic flash unit at a desirably rapid rate for a necessary number of cycles corresponding with the camera cycles required to exhaust a film unit supply.

SUMMARY

The present invention is addressed to a flat primary battery of improved capacity and to a photographic film assemblage incorporating the flat battery as a component thereof. While retaining requisite thinness and compactness for photographic utilization, the battery now described is characterized in exhibiting improved current drain capacities and recovery rates. As a consequence it is advantageously suited for powering advanced photographic systems incorporating electronic flash units and the like. In particular, batteries structured in accordance with the invention are capable of rapidly charging the capacitor of an electronic flash unit over a number of cycles corresponding with the film supply of a photographic film assemblage in addition to meeting the power demands of an associated automatic camera. As another advantageous feature, this improved performance of the instant battery is achieved utilizing components suited to high volume, low unit cost manufacturing techniques. In consequence, the important aspect of disposability of the power supply-film system at the exhaustion of the film unit supply of an associated cassette or container is maintained.

The planar primary battery of the present invention is characterized by a cathode composed of two cathode strata. The first cathode stratum is bonded to a current collector, e.g., a conductive polymeric layer, and comprises a particulate dispersion of cathode active particles in a binder matrix, the binder matrix being insoluble in but permeable to the aqueous electrolyte. The second cathode stratum is adhered to the first cathode stratum and comprises a slurry of cathode active particles dispersed in aqueous electrolyte. The electrolyte is provided in a quantity effective to wet the first cathode stratum without removing so much electrolyte from the second cathode stratum as to cause the slurry to "set up". By the addition of an effective amount of binder agent with the second cathode stratum slurry, advantageous extrusion type deposition techniques may be employed to provide this stratum. A separator effective to isolate the active components of the positive and negative electrodes but wettable to provide ion permeability is positioned within the planar or laminar pile structure. A frame-type border sealing arrangement is provided with the cells to assure the integrity of a completed battery structure.

In another embodiment of the invention, the cell structure described above additionally incorporates a negative electrode formed having a planar negative electrode current collector having bonded on one surface thereof a first anode stratum comprising a particulate dispersion of metallic anode particles in a binder matrix. The electrode further includes a second anode stratum adhered to said first anode stratum and comprising a slurry of a particulate dispersion of metallic anode particles in aqueous electrolyte.

Another feature and object of the invention is to provide a photographic film assembly in the form of a photographic film cassette incorporating a plurality of planar photographic film units positioned for sequential exposure at a light transmitting section thereof as well as for post-exposure withdrawal from the cassette through a withdrawal opening in one wall thereof. The cassette structure further incorporates a planar primary battery as described above.

Other objects of the invention will in part be obvious and will in part appear hereinafter.

The invention accordingly comprises the product possessing the construction, combination of elements and arrangement of parts which are exemplified in the following detailed disclosure.

For a fuller understanding of the nature and objects of the invention, reference should be had to the following detailed description taken in conjunction with the accompanying drawings.

DETAILED DESCRIPTION

Figure 1:
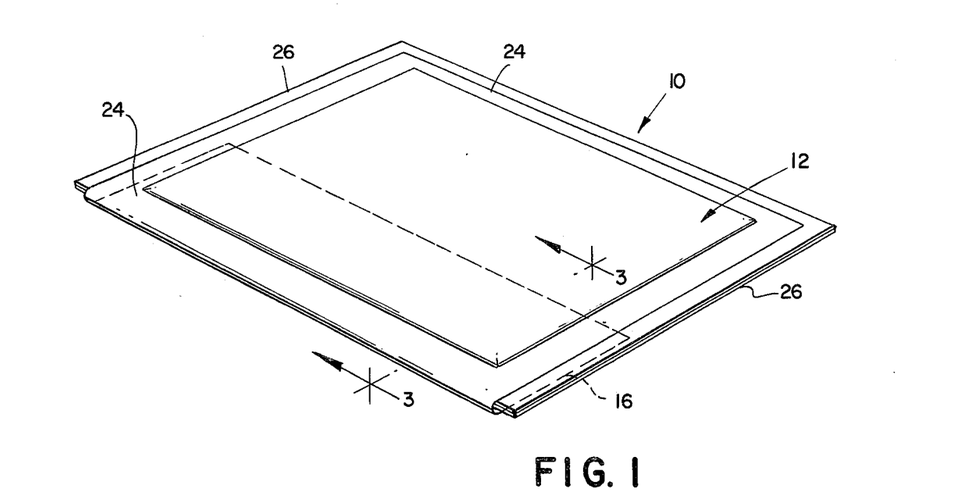
FIG. 1 is a perspective view of a flat primary battery structure according to the invention.

A multicell flat battery structure is presented generally at 10 in FIG. 1 as it would appear in an electrochemically active state following component buildup and prior to final packaging. Features of the battery structure apparent from this perspective view include an upwardly disposed anode current collector assembly 12, the outwardly facing surface 14 of which is fashioned of a metal to serve as a terminal. Current collector assembly 12 is folded about one side of battery structure 10 such that the terminal defining portion 16 of surface 14, as revealed in FIG. 3 and in phantom in FIG. 1, is located on the lower side of the battery. A cathode electrode collector assembly 20 (shown in FIGS. 3 and 4) is provided as the lowermost component of the battery and includes, in similar fashion as assembly 12, a metallic outwardly facing surface portion 22 which also serves as a terminal surface for the battery structure. With the geometry shown, cathode and anode terminals may be provided in convenient adjacency on one side of the pile assembly. The slightly depressed peripheral portion 24 of the assembly is occasioned from peripheral sealing procedures provided during assembly. This depression, as revealed in FIG. 3, necessarily becomes more exaggerated in a sectional view of the battery. Extending from the periphery of the battery and formed in the course of the sealing procedures, in an outer border seal 26 formed of a plurality of frame-type sealing elements which extend inwardly from the border portion shown to select laminar elements of the battery. This lamination, as at 26, is somewhat rigid, thereby enhancing the structural integrity of the flat battery configuration.

Figure 2:
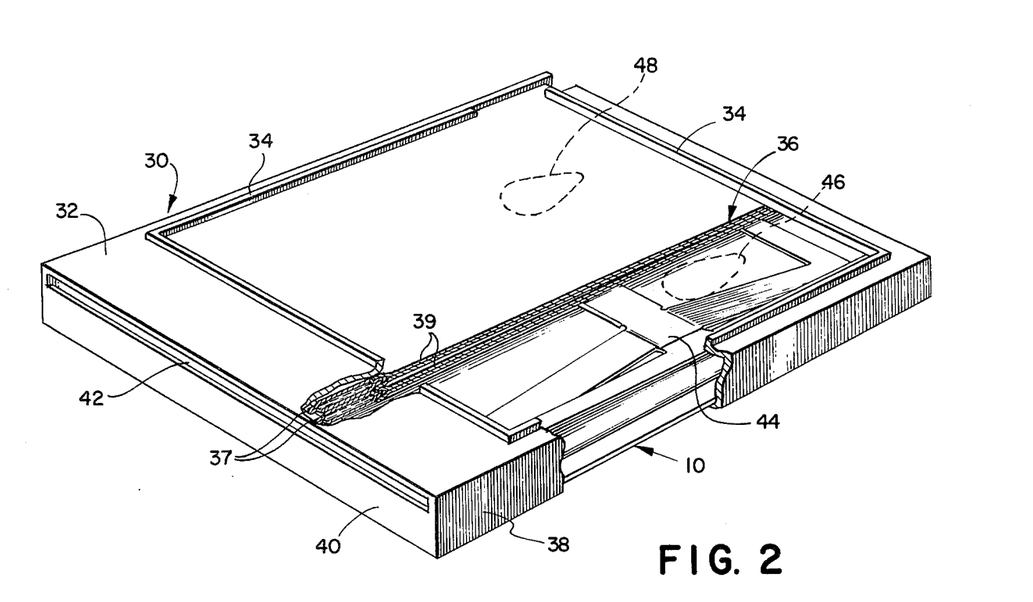
FIG. 2 is a perspective view of a photographic film assembly according to the invention with portions cut away to reveal internal structure.

Looking to FIG. 2, the photographic film assembly within which battery 10 is located is revealed in perspective. The assemblage is formed as a cassette structure comprising a generally parallelepiped shaped disposable container or box 30. Container 30 is shown to comprise a forward wall or surface 32 having an opening defined by a ridge 34 formed integrally therein which provides an opening for the exposure of the uppermost one of a stacked supply of film units shown generally at 36. Each of the film units at 36 generally includes a forwardly disposed pod 37 for retaining processing reagent, longitudinal edge of which is fixed to a laminar photosensitive structure 39. Container 30 further includes tapered sidewalls one of which is revealed at 38, a rear wall (not shown), and a leading end wall 40, all of which may be formed of a resilient plastic material. Leading end wall 40 is provided with a generally rectangular slot or exit orifice 42 which serves as a passage through which exposed uppermost ones of film units 36 may be individually withdrawn. Container 30 additionally may be provided with a dark slide or cover sheet (not shown) formed of any suitable opaque material such as paper or plastic sheet material positioned between the uppermost film unit of stack 36 thereof and the opening defined by ridge 34 to serve as a light seal. This cover may be removed by withdrawal through the slot 42 once the container 30 is located in its operative position within a camera.

Battery 10 is positioned on the lower interior surface of container 30 and, as disclosed in aforementioned U.S. Pat. No. 3,543,662, the cassette additionally includes a spring loaded platform 44 positioned intermediate the lowermost one of the film units at 36 and the upward facing surface of battery 10. Platform 44 serves to compressively retain battery 10 and the lower facing terminal surfaces thereof in aligned adjacency against terminal openings shown in phantom at 46 and 48 and formed within the lower wall of container 30. These openings are located so as to permit contact between terminal defining surfaces 16 and 22 of battery 10 and appropriate spring biased power supply contacts of a camera. Following exhaustion of all film units at 36 within the cassette structure, the assembly, including battery 10, is discarded.

Figure 3:
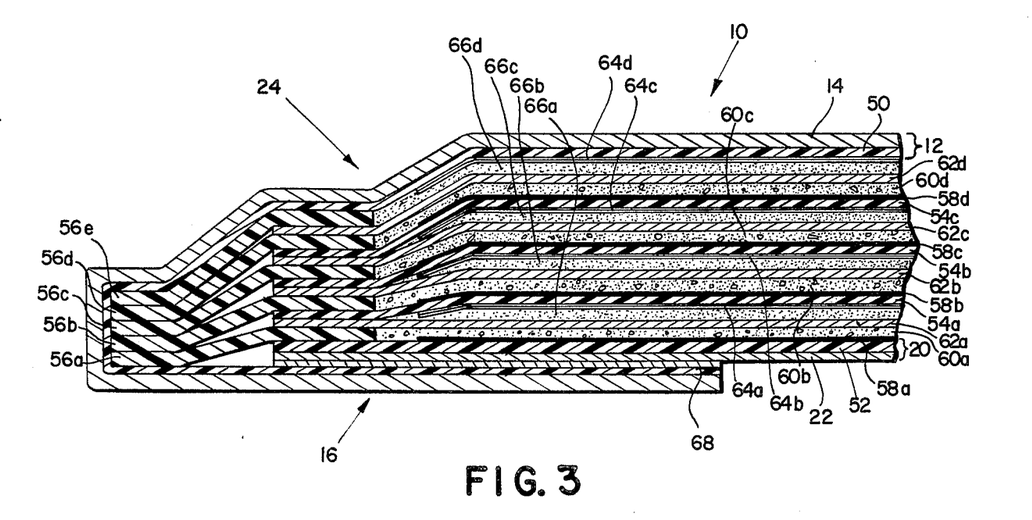
FIG. 3 is a sectional view of a battery structure according to the invention taken through the plane 3—3 of FIG. 1.
Figure 4:
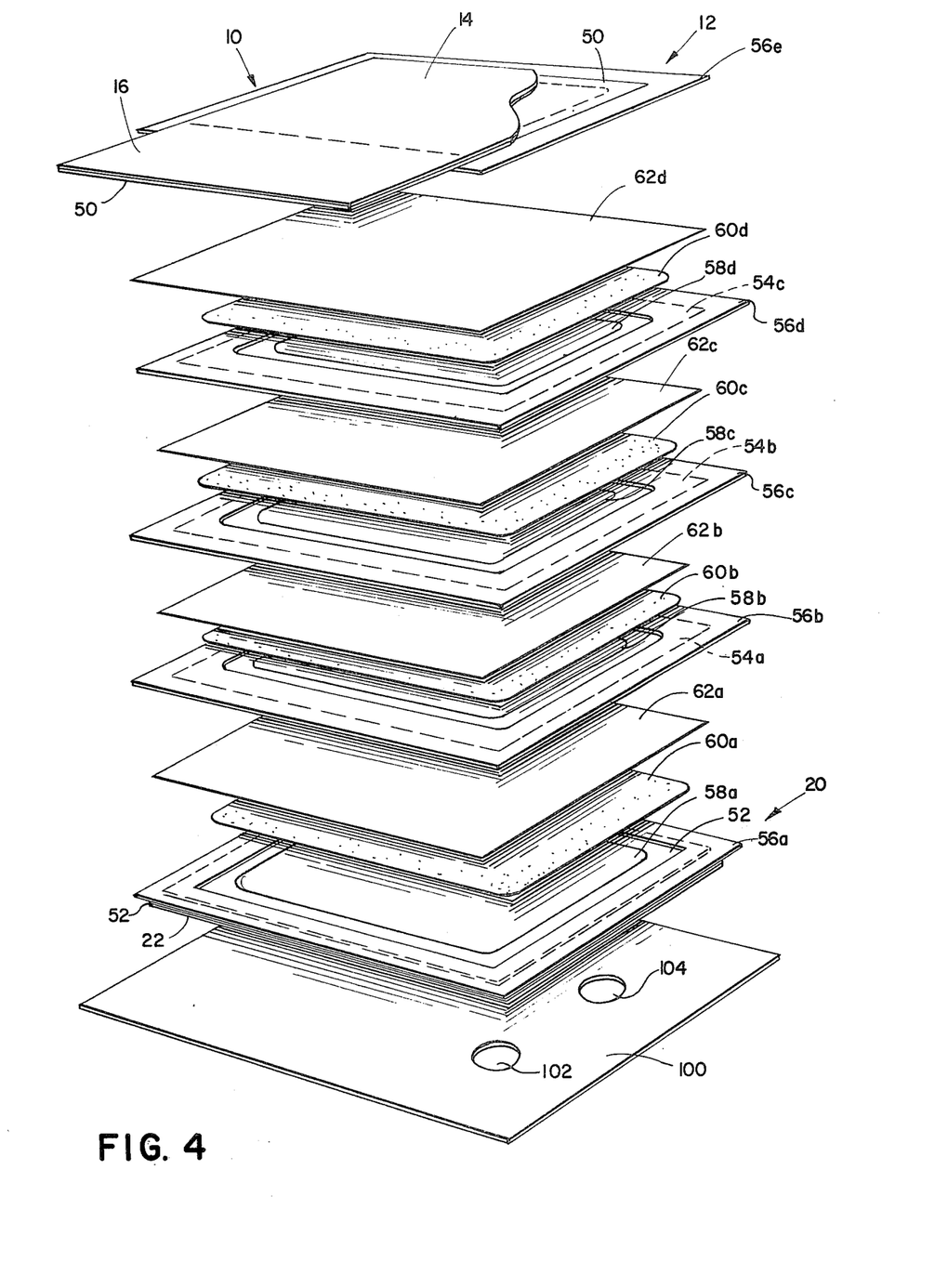
FIG. 4 is an exploded perspective representation of the components of a battery structure according to the invention, revealing the relative orientation of sheet-type components thereof.

Referring to FIGS. 3 and 4, the geometry or interrelationships of the discrete components forming battery pile 10 are revealed in detail. As described above, the exposed surfaces of the battery are present as an outer laminate of current collector assemblies 12 and 20. Prefabricated as discrete elements of the system, assemblies 12 and 20 are formed of a metallic sheet foil current collector which, in turn, is laminated to an internally disposed polymeric current collector. In this regard, assembly 12 is formed having a metallic surface current collector 14 serving as a terminal surface laminated with a polymeric current collector 50, while assembly 20 is formed having a metallic current collector outer terminal defining surface 22 laminated with polymeric current collector 52. Preferably, each of the metal current collectors 14 and 22 is provided as an annealed tin coated steel sheet, however, they also may be formed of aluminum or lead sheet material and are preferably on the order of less than 10 mils. in thickness for batteries configured for photographic utilization. Polymeric current collectors 50 and 52 may comprise a non-conductive matrix, for instance, of a thermoplastic material so thoroughly impregnated with conductive particles, as of carbon, for example as to be somewhat unidirectionally conductive. Preferably the polymeric layers of the battery are present as an electrically conductive carbon-impregnated vinyl film sold under the trade designation "Condulon" having a thickness on the order of about 2 mils. for the instant application. As is apparent, the assemblies are prelaminated together prior to their assembly within the battery pile. Collector sheets 50 and 52 generally are impervious to electrolyte, are electrochemically inert and are characterized in exhibiting a low resistance to the flow of current from one face to the opposite face thereof. Accordingly, discrete sheets of this same material may be utilized for geometric cell definition and additionally as intercell connectors within a series build-up of cells forming a primary battery pile structure.

Looking to the build-up of the pile structure, battery 10 is seen to be formed of four serially associated cell units which are electrically associated but chemically isolated by intercell connectors 54a–54c. The intercell connectors preferably are formed as discrete rectangular sheets of electrically conductive carbon-impregnated vinyl film, as described earlier in connection with collector sheets 50 and 52, and, for the instant application having a thickness on the order of about 2 mils. The peripheral integrity of the entire pile structure is provided by a sequence of frame-shaped border seals designated generally at 56a–56e. Being mutually identically dimensioned, frames 56a–56e are formed having inner borders which define rectangular inner openings which mutually cooperate to form the peripheries of individual cell cavities. Additionally, each of the frames is dimensioned such that it extends beyond the periphery of an associated polymeric intercell connector 54a–54c as well as the polymeric surface portion 52 of assembly 20. As revealed in FIG. 4, the frame 56e extends outwardly from three edges of assembly 20. As is noted from the drawings, frame 56a–56e are continuous and preferably are formed of a material heat sealable both along their commonly juxtaposed surfaces in the final pile structure as well as with polymeric collector sheets 50, 52 and 54a–54c. Material for the frames should be electrolyte impervious, remaining inert to the chemical activity of the battery structure. Preferably, frames 56a–54e are formed of polyvinyl chloride having a thickness, for the present application, of about 5 mils. The thermal sealing of the inner border surface areas to a corresponding polymeric sheet, for instance, as at 52, may be carried out in impulse fashion wherein the temperature of the sealed portion is raised from room temperature to about 275° F. and returned to room temperature over an interval of about 15 seconds.

To form an initial one of the pile cell structures, an initial collector assembly, for instance, cathode current collector assembly 20, may be preformed as a discrete assembly and a frame member 56a may be bonded thereto as described above. Preferably, predeposited at the upwardly disposed surface of polymeric current collector sheet 52 is a first cathode stratum 58a present in "dry patch" form and made up of materials suited for a Le Clanche electrochemical system. Predeposition of the stratum 58a may be carried out by depositing as by printing, silk screening or the like as a patch substantially coextensive with the electrochemically active portion of the surface of collector sheet 52 within the inner periphery of frame 56a a solvent or aqueous mixture of particulate carbon, manganese dioxide and binding agent. Other additives which may be added to the mixture are identified in detail later herein. Preferably, the ratio of manganese dioxide to carbon is selected on the order of 25:1 for this cathode mix layer. Following deposition of the mixture, the solvent (aqueous) phase thereof is removed by heat induced vaporization, thereby providing a particulate cathode mix dispersion within a binder which bonded to the surface of polymeric collector 52. Such "dry patch" electrode structures further are described, for instance, in U.S. Pat. No. 3,770,504. Over this subassembly, including dry first cathode stratum 58a, is deposited, preferably by extrusion, a second cathode stratum 60a which is present as a slurry of cathode active particles dispersed in aqueous electrolyte. Electrolyte will be extracted from this slurry by the first cathode stratum, and sufficient electrolyte should therefore be present in the slurry to insure that it remains a slurry, i.e., any binder present therein does not "set up" as it would if dried. In complement with the first cathode stratum 58a, this second stratum 60a will be present as a particulate dispersion of manganese dioxide and carbon dispersed within an aqueous electrolyte comprising ammonium chloride, zinc chloride and, additionally if preferred, a small amount of mercuric chloride, and preferably a binder. The binder for the slurry is one selected to maintain a homogeneous character for the dispersion therewithin and will exhibit a high tolerance for salt as well as stability from such effects as syneresis or the like. A particularly desirable characteristic for the binding agent is one which renders the slurry viscous, preferably thixotropic, thereby considerably facilitating extrusion-type deposition procedures. Binders which may be incorporated within the slurries may be categorized as polymeric, inorganic or natural gums and their amount, generally, less than one percent by weight of the electrolyte, as well as the consistency of the slurry, is selected so as to maintain extrudability while still providing a concentration of particulate matter per unit area effective to assure that the dispersion is electrically conductive so as to maintain a proper electrode function. In effect, the dispersion provides for adequate interparticulate contact to assure electrical conductivity while, at the same time, providing a maximum exposure of particulate surface area to ion conduction as derived from the electrolyte component of the slurry.

From the above, it will be seen that the "first cathode stratum", while referred to as a "dry patch", has many of the characteristics of a "paint" after it has been dried. In contrast, the second cathode stratum is not dried, and while referred to as a "slurry", also may be characterized as "paste-like", exhibiting adherence to the first cathode stratum, without pressure being applied, sufficient to prevent the formation of a separate layer of electrolyte therebetween, as by capillary action. (Indeed, it has been found that if a separator was placed between the first and second cathode strata, the electrical properties of the resulting battery were not greatly different from those of a conventional "dry patch" only battery.)

Upon deposition, as by extrusion, of second cathode stratum or slurry 60a, a selectively dimensioned sheet of battery separator material 62a is positioned thereover. This material is selected as being wettable by the slurry depositions with which it is in contact as well as being ionically permeable. Additionally, the material should exhibit a texture or porosity, the intersititial openings or channels of which are of adequately fine geometry or size to assure that no migration of the particulate matter of the slurry from the positive electrode environment into the environment of the negative electrode may occur. Among the materials conventionally used as separators mention may be made of fibers and cellulosic materials, woven or nonwoven fibrous materials such as polyester, nylon, polypropylene, polyethylene or glass. Specifically, a Kraft paper having a thickness of about 2.0 mils has been found to be adequate for the purpose of the instant application. A preferred separator is cellophane or regenerated cellulose, as described in more detail below. As shown in FIGS. 3 and 4, separator 62a as well as separators 62b–62d are dimensioned as having the same peripheral shape and size as polymeric collector 20 or intercell connectors 54a–54c. In this regard, note that the separators are dimensioned such that their peripheries extend over the inner rectangular openings defined by the inner borders of frames 56a-56e.

As represented in FIG. 3, in the preferred embodiment, the negative electrode of each cell of the battery 10 is present as a "dry patch" deposition of zinc negative active material as at 64a dispersed in a binder matrix. This material is predeposited upon one side of intercell connector 54a. As in the case of cathode "dry patch" deposition, patch 64a is preformed upon the surface of intercell connector 54a by printing, silk screening or the like an aqueous mixture of particulate negative active material, such as zinc in combination with a binding agent. The aqueous phase of the mixture subsequently is removed by heat induced vaporization. As in the case of "dry patch" deposition 58a, anode deposition 64a is provided substantially coextensive with the electrochemically active portion of the surface of intercell connector 54a.

Deposited over anode material 64a and coextensive the surface thereof is electrolyte 66a. This electrolyte ordinarily will comprise a conventional aqueous solution of ammonium chloride such as hydroxyethyl cellulose. In addition, a small quantity of mercuric chloride may be present in the electrolyte as a corrosion inhibitor. The electrolyte may be deposited utilizing conventional positive displacement techniques, doctoring, silk screening or the like.

The first cell build-up is completed with the positioning in registry of intercell connector 54a over the subassembly of current collector assembly 20, the positive electrode combination and separator 62a. Intercell connector 54a is formed, as mentioned above, incorporating a border sealing frame 56b the inner surface portion of which is thermally bonded to the outwardly disposed surface of the intercell connector sheet. Upon being so positioned to define the cell, the outer peripheral border surface portions of frame 56b are thermally bonded with the corresponding outer surface portion of frame 56a. In addition to serving as an intercell connector, sheet 54a also serves as the current collector for the negative electrode of the initial cell. Note that within the initial cell, separator 62a extends not only sufficiently to separate the electrode slurry 60a and negative electrode 64a but also is configured to provide electrical separation of current collector sheets 52 and 54a and to extend over the thermal bonding surface between each frame member and its associated current collector sheet. With this arrangement, no inadvertent shorting effects or the like are likely to arise. Further, such geometry assures that no migration of the particulate dispersion of electrode slurry 60a into the environment of the opposite electrode occurs.

To provide the multicellular pile structure, for instance, having four cells as illustrated in the drawings, the pile build-up is carried out in a sequence suited to the manufacturing technique desired. Note, initially, that polymeric current collector sheet 54a is fashioned as an intercell connector, preferably, being prefabricated incorporating "dry patch" anode electrode as at 64a on one surface and a "dry patch" electrode 58b oppositely disposed on its other surface. Accordingly, sequential pile build-up may be effected by reiteration of the essential features of the initial cell structure. For convenience of identification, repeating identical components in the four cell structure illustrated are indicated by the same numeration in combination with an appropriate alphabetical suffix.

As an example of one fabricating technique, the initial cell is formed as above described by depositing cathode slurry 60a over assembly 20 and "dry patch" 58a, following which separator 62a is positioned over in appropriate registry with polymeric collector 52. Electrolyte 66a then is deposited over "dry patch" anode deposition 64a of intercell connector 54a and the connector 54a as well as previously attached frame 56b is joined with collector assembly 20 and thermally bonded thereto at the adjoining surfaces of frames 56a and 56b. Cathode slurry material as at 60b then is deposited on one side of a next separator sheet 62b and the subassembly is placed in appropriate registry over "dry patch" cathode deposition 58b located upon the opposite side of polymeric intercell connector 54a. Electrolyte composition 66b then is deposited over "dry patch" anode 64b located upon one side of another polymeric intercell connector 54b. Intercell connector 54b, including previously attached frame 56c then is placed over the subassembly including separator 62b following which frame 56c is thermally bonded with frame 56b. This procedure essentially is reiterated until the entire pile structure including anode current collector assembly 12 is attached. Following desired final thermal bonding of the entire stacked array of cells, extended portion 16 of collector assembly 12 is covered with an insulative tape 68 and wrapped around to the underside of the battery to provide for juxtaposed terminal defining surfaces. The battery assembly may then be mounted upon a supporting card as at 100 having apertures 102 and 104 preformed therein to provide access to the noted terminal defining surfaces. An electrically insulative covering (not shown) then may be adhesively attached over assembly 12 to hold the battery in position over card 100. The thus completed battery may be inserted within the cassette structure of FIG. 2 such that apertures 102 and 104 are aligned respectively with openings 48 and 46.

In another embodiment of the invention, a slurry of negative active material may be substituted for the electrolyte depositions at 66a-66d to provide second anode strata. Such negative electrode slurries may comprise a particulate dispersion of metallic anode particles disposed in a binder matrix retaining, as in the case of the positive slurry, a substantially uniform distribution of aqueous electrolyte. For the present Le Clanche system, zinc particles are utilized as the active material and are present in a concentration per unit area effective to provide an electrically conductive dispersion thereof, while the electrolyte is present in intimate surface contact with the particles in a concentration rendering the slurry ionically conductive. A zinc particle size of, for example, about eight microns mean diameter may be utilized with the slurry. The binder agent utilized for the slurry is selected to permit fascile deposition thereof as by extrusion and for assuring access of the electrolyte of the slurry to substantially all surfaces of the particles.

Similarly, the electrolyte utilized with the negative aqueous slurry of the system ordinarily will comprise a conventional aqueous solution of ammonium chloride/ zinc chloride with an addition of a small quantity of mercuric chloride as a corrosion inhibitor.

The second cathode stratum or slurry also may be formed in situ by the procedure described and claimed in the copending application of Otto E. Wolff, Ser. No. 514,458 filed Oct. 15, 1974 (now abandoned in favor of a continuation-in-part application Ser. No. 694,026 filed June 7, 1976).

As noted above, the second cathode stratum is a slurry which may include a binder or dispersing agent. The particular binder utilized must, of course, be compatible with the components of the particular electrolyte, and must not increase impedance within the cell, be subject to syneresis, or interfere with the adherence of the second cathode stratum to the first cathode stratum. If the anode includes a second anode stratum or slurry, the binders used in the respective cathode and anode slurries may be the same or different, their suitability being readily determined by routine experimentation. As examples of polymer binders which may be used in such electrode slurries mention may be made of methylcellulose (sold under the trade name "Methocell 4000" by Dow Chemical Co., Midland, Mich.), polyethylene oxide (sold under the trade name "Polyox" by Union Carbide Corp., New York, N.Y.), hydroxypropyl cellulose (sold under the trade name "Klucel" by Hercules Incorporated, Wilmington, Del.), heteropolysaccharide (anionic) (sold under the trade name "Xanthon Gum" by General Mills Corp., Minneapolis, Minn.), and poly-2-acrylamido-2-methylpropane sulfonic acid. Exemplary inorganic binder agents which may be found effective with the instant system are organic derivatives of hydrous magnesium aluminum silicate (sold under the trade name "Bentone" by National Lead Co., New York, N.Y.), highly purified magnesium montmorillonite (sold under the trade name "Benagel" by Baroid Div., National Lead Co., New York, N.Y.), colloidal silica (sold under the trade name "Cabosil" by G. L. Cabot, Inc., Boston, Mass.) and complex magnesium aluminum silicate (sold under the trade name "Vergum" by R. T. Vanderbilt Co., New York, N.Y.). A natural gum binder agent may be, for example, a guar gum derivative (sold under the trade name "Jaguar" by Stein, Hall & Co., New York, N.Y.). A preferred binder agent particularly useful in preparing cathode slurries is the above-identified poly-2-acrylamido-2-methylpropane sulfonic acid, which is the subject of the copending application of Charles I. Sullivan, Ser. No. 532,906, filed Dec. 16, 1974.

The ratio by weight of manganese dioxide to carbon within the second cathode stratum or slurry preferably is between about 6:1 and 12:1, with a ratio of 8:1 being particularly preferred. It is believed that the use of a higher carbon concentration in the second cathode stratum than in the first cathode stratum not only is beneficial for electrical conductance but it also aids in insuring that the second cathode stratum will be well adhered to the first carbon stratum.

Generally, a solids content for the cathode slurry of about 60 to 70% in combination with the earlier described binder agent addition has been observed to provide acceptable consistencies for extrusion techniques of deposition.

Figure 5:
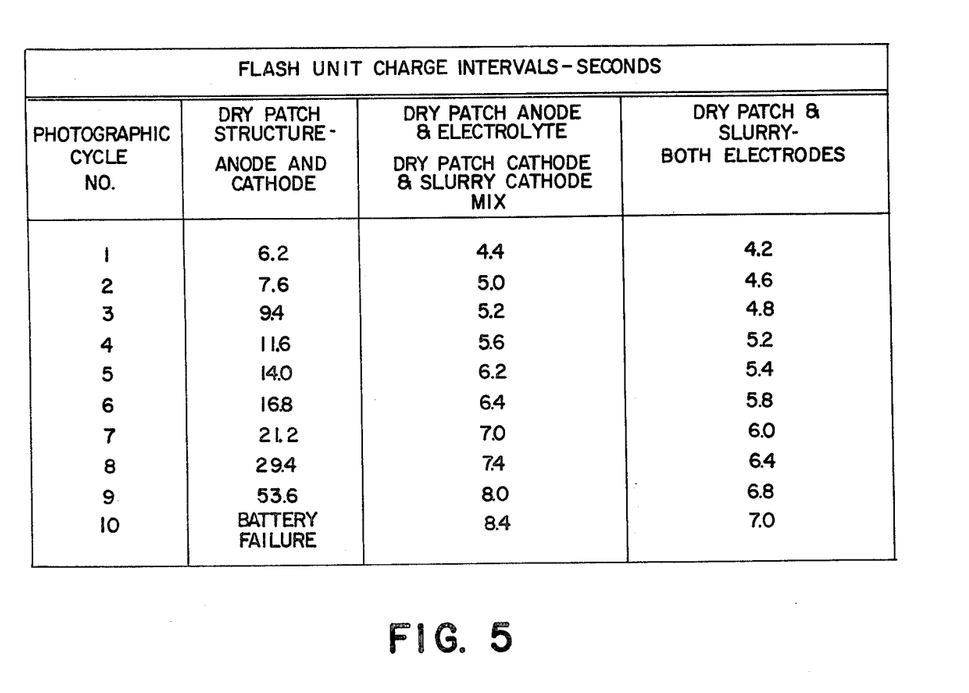
FIG. 5 is a tabulation showing the performance of batteries fabricated according to the invention as they are utilized to charge the capacitor of a flash unit during ten photographic cycles, the data being arranged for comparison with control battery structures.

As described in the above-mentioned copending application for U.S. Pat. Ser. No. 411,254 flat thin laminar batteries may be uniquely suited to provide the rapid recharge capability required by an electronic flash unit. This results from the high current drain capability resulting from the maintenance of low internal impedance and from the relatively large area of the individual cells of the battery relative to the weight and volume thereof. For operating an automatic camera incorporating a complex photographic cycle as described in the above-mentioned U.S. Pat. No. 3,774,516 in conjunction with an electronic flash, the necessary energy requirements of the battery may be specified, for instance, in watt seconds. While such current drain capabilities might be achieved using a variety of battery structures, for practical photographic purposes it is desirable that rapid recycling occur between operation of the flash unit. Recycling time, for the most part, depends upon the speed which the capacitor within the electronic flash unit can be recharged, which is determined by the amount of current that can be taken from the battery without damage thereto. Accordingly, a test was devised wherein a Polaroid SX-70 camera, as above mentioned, was provided with an electronic flash unit (40 watt second output) and actuated to carry out a flash illumination photographic cycle following flash unit capacitor chargeup and following a 30 second battery rest interval. Nominally, the photographic apparatus required 106 watt seconds for each such actuation. The tabulations in FIG. 5 show the initial and subsequent recharge intervals required for the electronic flash unit in the test above described for four cell battery units: (a) utilizing first a "dry patch" first cathode stratum in combination with a "slurry" second cathode stratum with a "dry patch" anode; (b) utilizing dual "dry patch" and slurry strata for both electrodes; and (c) utilizing as a control the conventional "dry patch" anode and cathode structure previously described. The slurry formulations for the batteries were as follows:

| Negative "slurry" second anode stratum: | | |
|---|---|---|
| "Methocel 4000" (identified supra) | 2 | gm. |
| ammonium chloride | 68 | gm. |
| zinc chloride | 30.9 | gm. |
| mercuric chloride | 5.9 | gm. |
| powdered zinc | 300 | gm. |
| water | 198 | ml. |
| Positive "slurry" second cathode stratum: | | |
| ammonium chloride | 33 | gm. |
| zinc chloride | 15 | gm. |
| mercuric chloride | 3 | gm. |
| 10% solution of 2-acrylamido-2-methylpropane sulfonic acid | 60 | gm. |
| carbon black | 25 | gm. |
| manganese dioxide | 200 | gm. |
| water | 45 | ml. |

The "dry patch" electrodes were deposited from mixtures having the following formulations, following which the aqueous phase thereof was removed by heat induced vaporization, to provide about 0.5 g. of anode material and about 1 g. of cathode material, distributed over an anode area of about 1 ⅞ × 2 ½ inches and a cathode area of about 2 × 2⅞₁₆ inches. The cathode slurry was deposited at about 2.5 g. over approximately the same area.

| Negative "dry patch" electrode: | | |
|---|---|---|
| powdered zinc | 1000 | gm. |
| carbon black | 5 | gm. |
| "Polytex 6510" (an acrylic emulsion resin sold by Celanese Corp., Newark, N.J.) | 39.1 | gm. |
| "Bentone LT" (identified supra) | 0.62 | gm. |
| tetra-sodium pyro phosphate | 0.25 | gm. |
| water | 150. | gm. |
| Positive "dry patch" electrode: | | |
| particulate magnesium dioxide | 1000 | gm. |
| "Shawinegan" black (a carbon black sold by Shawinegan Products Corp., New York, N.Y.) | 40 | gm. |
| "BP-100" (a latex sold by Exxon Chemical Co., Houston, Texas) | 67.68 | gm. |
| Ethylene diamine tetra-acetic acid (sold under the trade name "Versene" by Dow Chemical Co., Midland, Mich.) | 4.12 | gm. |
| tetra-sodium pyro phosphate | 10 | gm. |
| "Lomar D" (a dispersing agent sold by Nopco Chemical Co., Newark, N.J.) | 3.85 | gm. |
| Water | | in sufficient quantity for deposition |

The gel electrolyte was provided at a coverage of about 0.5 g. in the control and on the anode side of the first mentioned test battery, from formulations as follows:

| water | 923 | cc |
|---|---|---|
| ammonium chloride | 326.6 | gm. |
| mercuric chloride | 32.66 | gm. |
| zinc chloride | 246 | gm. |
| "Natrosol 250 HHR)" (hydroxy ethyl cellulose, sold by | | |

| | |
|---|---|
| Hercules Incorporated, Wilmington, Del.) | 49.9 gm. |

The data of FIG. 5 reveals that the combined slurry-"dry patch" electrode system of the invention provides for improved recycling rates, current drain and energy capacities.

The improved performance of batteries constructed in accordance with this invention is not due simply to the presence of the additional cathode material provided by the second cathode stratum. This has been demonstrated by the assembly of batteries similar to the control battery "c" described above but with a cathode mix coverage of approximately 4 g., using the same cathode mix except the ethylene diamine tetraacetic acid was omitted. These batteries exhibited slower recycle times in the above strobe test. After 4 months storage at room temperature, a marked buildup in impedance had occurred, as illustrated by the fact that the average open circuit voltage of one lot of such batteries was 6.81 but the average closed circuit voltage was 4.90.

As noted above, Kraft paper may be used as the separator. Under some conditions, impurities in the Kraft paper may react with the manganese dioxide to generate undesired gas. Additionally, any penetration of the Kraft paper by manganese dioxide particles in the second cathode stratum may cause internal shorting. Notwithstanding these facts, it has been found that batteries constructed in accordance with the present invention and using Kraft paper separators have quite useful shelf lives. Thus, a lot of batteries similar to test battery (a) above after one year storage at room temperature were found to have an average open circuit voltage of 6.47 and an average closed circuit voltage of 5.94, both values being generally higher than batteries similar to the control battery (a) above.

As noted above, a preferred separator is a semipermeable membrane such as cellophane or regenerated cellulose; such separators are the subject of my copending application Ser. No. 589,334 filed June 23, 1975, which application is hereby incorporated herein. Ser. No. 589,334 is now abandoned in favor of a continuation-in-part application Ser. No. 684,370 filed May 7, 1976.) Batteries constructed in accordance with the present invention and having first and second cathode strata as described above and utilizing cellophane separators, after one year storage at room temperature were found to have an average open circuit voltage of 6.54 and an average closed circuit voltage of 6.07.

The use of a slurry cathode in a planar battery is disclosed in the copending application of Arnold Hoffman, Ser. No. 409,857 filed Oct. 26, 1973 (now U.S. Pat. No. 3,953,242 issued Apr. 27, 1976). That application discloses a manganese oxide-carbon slurry cathode in combination with a powered zinc anode of the conventional "dry patch" type. Planar batteries having a slurry cathode and a slurry anode are disclosed in the copending application of Sheldon A. Buckler, Ser. No. 495,681 filed Aug. 8, 1974. It has been found, however, that such slurry electrode batteries tend to exhibit substantial increases in impedance during storage, a characteristic which limits their utility in certain applications, such as the above-described electronic flash application. The batteries of the present invention are much less susceptible to such impedance buildup. It is believed that this improvement may be due to the greater ability to adhere a slurry cathode mix to a dry patch cathode than to a conductive plastic such as Condulon. It has been found that the formation of a layer of electrolyte between the slurry cathode and the conductive plastic, as by capillary action, increases the impedance; application of pressure is necessary to restore good electrical contact.

In general, it has been found that about 2.25 to 2.65 g. of manganese dioxide cathode slurry deposited over about 1 to 1.2 g. of manganese dioxide cathode dry patch will provide highly useful battery performance, using a cathode area as described above.

Film units as at 36 (FIG. 2) may be advantageously constructed in accordance with the disclosure of any of U.S. Pat. Nos. 3,594,165; 3,689,262; 3,672,890; and other patents mentioned herein.

Specifically preferred film units of the types disclosed in the last-mentioned U.S. patents comprise integral negative positive color diffusion transfer process film units which include, in combination, a photosensitive silver halide layer having associated therewith a diffusion transfer process dye image-forming material adapted to diffuse to a diffusion transfer process image-receiving layer as a function of the point-to-point degree of exposure and processing of the photosensitive silver halide layer; a diffusion transfer process image-receiving layer adapted to receive dye image-forming material diffusing thereto to provide dye transfer image formation, and a light-reflecting layer disposed intermediate the photosensitive silver halide layer and the image-receiving layer against which the dye transfer image in the reception layer may be viewed subsequent to formation.

As disclosed in U.S. Pat. No. 3,672,890 a composite photosensitive structure, particularly adapted for reflection type photographic diffusion transfer color process employment, which comprises a plurality of essential layers including, in sequence, a dimensionally stable layer preferably opaque to incident radiation; one or more silver halide emulsion layers having associated therewith a diffusion transfer process dye image-providing material; a polymeric layer adapted to receive solubilized dye image-providing material diffusing thereto; and a dimensionally stable transparent layer, may be exposed to incident actinic radiation and processed by interposing, intermediate the silver halide emulsion layer and the reception layer, a processing composition and a light-reflecting agent in a quantity sufficient to mask the developed negative and nontransferred dye image-providing material.

In a preferred embodiment, the composite photosensitive structure includes a rupturable container, retaining an alkaline processing composition and the opacifying agent, fixedly positioned extending transverse a leading edge of the composite structure in order to effect, upon application of compressive pressure to the container, discharge of the processing composition intermediate the opposed surfaces of the reception layer and the next adjacent silver halide emulsion.

The liquid processing composition, distributed intermediate the reception layer and the silver halide emulsion, permeates the silver halide emulsion layers of the composite photosensitive structure to initiate development of the latent images contained therein resultant from photoexposure. As a consequence of the development of the latent images, dye image-providing material associated with each of the respective silver halide emulsion layers is individually mobilized as a function of the point-to-point degree of the respective silver halide emulsion layer's photoexposure, resulting in imagewise distributions of mobile dye image-providing materials adapted to transfer, by diffusion, to the reception layer to provide the desired transfer dye image. Subsequent to substantial dye image formation in the reception layer, means associated with composite structure are adapted to convert the pH of the film unit from a first processing pH at which dye image-providing material is diffusible as a function of development to a second pH at which the transfer dye image exhibits increased stability; preferably a sufficient portion of the ions of an alkaline processing composition transfers, by diffusion, to a polymeric neutralizing layer to effect reduction in the alkalinity from a first alkaline processing pH to the second pH at which dye image-providing material is substantially nondiffusible, and further dye image-providing material transfer is thereby substantially obviated.

The transfer dye image is viewed, as a reflection image, through the dimensionally stable transparent layer against the background provided by the light-reflecting agent, distributed as a component of the processing composition, intermediate the reception layer and next adjacent silver halide emulsion layer. The thus-formed light-reflecting stratum effectively masks residual dye image-providing material retained in association with the silver halide emulsion layer subsequent to processing.

In U.S. Pat. No. 3,415,644, the dimensionally stable layer of the film unit next adjacent the photosensitive layer or layers is disclosed to be opaque, the light-reflecting agent is initially disposed in an aqueous alkaline processing composition and the film unit's pH modulating means are disclosed to comprise a polymeric layer disposed intermediate the dimensionally stable transparent layer and the reception layer and adapted to reduce, subsequent to substantial dye transfer image formation, the pH of an aqueous alkaline processing composition from a first processing pH at which the dye image-forming material or materials are soluble and diffusible in the composition as a function of the photoexposure of the photosensitive silver halide layer associated therewith to a second pH at which the dye image-forming material or materials are substantially nondiffusible. As disclosed in U.S. Pat. No. 3,415,646, the dimensionally stable layer of the film unit next adjacent the photosensitive silver halide layer or layers may be transparent to incident actinic radiation. As further disclosed in U.S. Pat. No. 3,415,645, in such instance the light-reflecting layer may be initially disposed in the film unit intermediate the reception layer and next adjacent silver halide layer.

In U.S. Pat. No. 3,647,437, the opacifying component is disclosed to preferably comprise a combination of a light-reflecting agent and a light-absorbing reagent such as a dye which is present as an absorbing species at a first pH and which may be converted to a substantially non-absorbing species at a second pH.

In U.S. Pat. No. 3,573,043, the polymeric neutralizing layer is disclosed to be optionally disposed intermediate the dimensionally stable opaque layer and next adjacent essential layer, i.e., next adjacent silver halide/dye image-providing material component, to effect the designated modulation of film unit's environmental pH;

U.S. Pat. No. 3,576,625 discloses the employment of particulate acid distributed within the film unit to effect the modulation of the environmental pH, and U.S. Pat. No. 3,573,044 discloses the employment of processing composition solvent vapor transmissive dimensionally stable layers to effect process modulation of dye transfer as a function of solvent concentration.

Where desired, the film unit may also be constructed in accordance with the disclosure of U.S. Pat. Nos. 3,594,164; 3,594,165; 3,689,262 and 3,701,656 to comprise a composite photosensitive structure including a transparent dimensionally stable layer carrying a reception layer, a processing composition permeable opaque layer and a photosensitive silver halide layer and the film unit may include a separate dimensionally stable sheet element adapted to be superposed on the surface of the photosensitive structure opposite the dimensionally stable layer and may further include means such as a rupturable container retaining processing composition for distribution of a processing composition intermediate the sheet and photosensitive structure to effect processing. As further disclosed in certain of the last-cited patents and applications, in structures wherein the receptor is positioned next adjacent the transparent layer or the processing composition and/or the sheet is to be separated from the remainder of the film unit subsequent to processing, the latter elements may optionally include opacifying component.

As disclosed in U.S. Pat. No. 3,620,724, the dimensionally stable layer referred to may be opaque and in which instance the photosensitive silver halide layer is positioned next adjacent the opaque support layer and the opacifying component of the film unit's processing composition permeable opaque layer will be disposed in the unit in a concentration insufficient to prevent transmission therethrough of exposing actinic radiation and which, subsequent to processing, possesses a light-reflecting capacity effective to mask residual dye image-providing material retained associated with the silver halide layer.

The above description has been directed primarily towards the special applicability of the novel battery of this invention to photographic applications employing electronic flash. It will be understood that this battery also is useful in other photographic applications, e.g., to power a camera using film cassettes which individually do not include a battery, a plurality of film cassettes being processed using a single battery.

Since certain changes may be made in the above product and apparatus without departing from the scope of the invention herein involved, it is intended that all matter contained in the above description or shown in the accompanying drawings shall be interpreted as illustrative and not in a limiting sense.

I claim

1. A planar primary battery having at least one cell, said cell comprising an anode, a cathode and a planar electrolyte ion permeable separator positioned between said anode and said cathode; said cathode comprising a planar cathode current collector carrying on one surface thereof, in order, a first cathode stratum and a second cathode stratum; said first cathode stratum being of the "dry patch" cathode type and comprising a particulate dispersion of cathode active particles in a binder matrix, said binder matrix being insoluble in but permeable to aqueous electrolyte and bonded to said cathode current collector; said second cathode stratum being substantially coextensive with said first cathode stratum and comprising a slurry of said cathode active particles dispersed in aqueous electrolyte and adhered to said first cathode stratum, the cathode particles in said first and second cathode strata being the same.

2. A primary battery as defined in claim 1 wherein said second cathode stratum includes a binder.

3. A primary battery as defined in claim 1 wherein said cathode active particles are manganese dioxide.

4. A primary battery as defined in claim 1 wherein said aqueous electrolyte includes ammonium chloride and zinc chloride.

5. A primary battery as defined in claim 1 wherein said electrolyte includes zinc chloride, ammonium chloride and mercuric chloride.

6. A primary battery as defined in claim 1 wherein said anode comprises a planar anode current collector carrying on one surface thereof, in order, a first anode stratum and a second anode stratum, said first anode stratum being of the "dry patch" anode type and comprising a particulate dispersion of anode active particles in a binder matrix, said binder matrix being insoluble in but permeable to aqueous electrolyte and bonded to said anode current collector; said second anode stratum being substantially coextensive with said first anode stratum and comprising a slurry of said anode active particles dispersed in aqueous electrolyte and adhered to said first anode stratum, the anode active particles in said first and second anode strata being the same.

7. A primary battery as defined in claim 1 wherein said anode active particles are metallic zinc.

8. A primary battery as defined in claim 1 wherein said separator is Kraft paper.

9. A primary battery as defined in claim 1 wherein said separator is a regenerated cellulose.

10. A primary battery as defined in claim 1 wherein said current collector is an electrically conductive polymeric layer.

11. A primary battery as defined in claim 1 wherein said current collector is an intercell connector.

12. A primary battery comprising a plurality of cells as defined in claim 1, said cells being superposed upon each other and connected in series by electrically conductive polymeric intercell connectors.

13. A primary battery as defined in claim 2 wherein said binder in said second cathode stratum is a hydrophilic polymer.

14. The primary battery of claim 3 wherein said cathode strata include carbon.

15. A primary battery as defined in claim 3 wherein said anode active particles are metallic zinc.

16. A primary battery as defined in claim 14 wherein said manganese dioxide and carbon are present in said second cathode stratum, respectively, in a weight-to-weight ratio from between about 6:1 and 12:1.

17. A primary battery as defined in claim 14 wherein said manganese dioxide and carbon are present in said second cathode, respectively, in a weight-to-weight ratio of 8:1.

18. A primary battery as defined in claim 14 wherein said manganese dioxide and carbon particles are present in said first cathode stratum, respectively, in a weight-to-weight ratio of about 25:1 and said manganese dioxide and carbon particles are present in said second cathode stratum, respectively, in a weight-to-weight ratio from between about 6:1 and 12:1.

* * * * *

UNITED STATES PATENT AND TRADEMARK OFFICE
CERTIFICATE OF CORRECTION

PATENT NO. : 4,007,472
DATED : February 8, 1977
INVENTOR(S) : Edwin H. Land

It is certified that error appears in the above-identified patent and that said Letters Patent are hereby corrected as shown below:

Column 5, line 29, "in" should be --is--.

Column 7, line 4, "frame" should be --frames--.

Column 7, line 11, "56a-54e" should be --56a-56e--.

Column 9, line 6, after "chloride" insert --and zinc chloride having dissolved therein a polymeric thickener--.

Column 13, line 46, before "Ser." insert --(--.

Signed and Sealed this

Twentieth Day of February 1979

[SEAL]

Attest:

RUTH C. MASON
Attesting Officer

DONALD W. BANNER
Commissioner of Patents and Trademarks